US012365973B2

(12) United States Patent
Takatani et al.

(10) Patent No.: US 12,365,973 B2
(45) Date of Patent: Jul. 22, 2025

(54) MANUFACTURING METHOD OF GRAIN-ORIENTED ELECTRICAL STEEL SHEET

(71) Applicant: NIPPON STEEL CORPORATION, Tokyo (JP)

(72) Inventors: Shinsuke Takatani, Tokyo (JP); Takashi Kataoka, Tokyo (JP); Yoshiyuki Ushigami, Tokyo (JP); Kenichi Murakami, Tokyo (JP); Hiroyasu Fujii, Tokyo (JP); Shingo Okada, Tokyo (JP); Seiki Takebayashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 481 days.

(21) Appl. No.: 17/422,225

(22) PCT Filed: Jan. 16, 2020

(86) PCT No.: PCT/JP2020/001194
§ 371 (c)(1),
(2) Date: Jul. 12, 2021

(87) PCT Pub. No.: WO2020/149348
PCT Pub. Date: Jul. 23, 2020

(65) Prior Publication Data
US 2022/0081749 A1 Mar. 17, 2022

(30) Foreign Application Priority Data
Jan. 16, 2019 (JP) .................................. 2019-005129

(51) Int. Cl.
| *C21D 8/12* | (2006.01) |
| *C21D 9/46* | (2006.01) |
| *C22C 38/00* | (2006.01) |
| *C22C 38/04* | (2006.01) |
| *C22C 38/06* | (2006.01) |
| *C22C 38/20* | (2006.01) |
| *C22C 38/34* | (2006.01) |
| *C22C 38/60* | (2006.01) |
| *C23G 1/08* | (2006.01) |

(52) U.S. Cl.
CPC ............ *C22C 38/60* (2013.01); *C21D 8/1222* (2013.01); *C21D 8/1233* (2013.01); *C21D 8/1255* (2013.01); *C21D 8/1272* (2013.01); *C21D 9/46* (2013.01); *C22C 38/001* (2013.01); *C22C 38/04* (2013.01); *C22C 38/06* (2013.01); *C22C 38/20* (2013.01); *C22C 38/34* (2013.01); *C23G 1/08* (2013.01); *C21D 2201/05* (2013.01)

(58) Field of Classification Search
CPC .. H01F 1/00; H01F 41/00; C21D 1/26; C21D 1/28; C21D 1/30; C21D 1/32; C21D 1/74; C21D 1/76; C21D 3/04; C21D 6/008; C21D 8/0257; C21D 8/0457; C21D 8/1255; C21D 8/12; C21D 9/46; C21D 9/48; C21D 2201/05
See application file for complete search history.

(56) References Cited

U.S. PATENT DOCUMENTS

| 4,875,947 A | 10/1989 | Nakayama et al. |
| 2002/0038678 A1 | 4/2002 | Ushigami et al. |
| 2011/0180187 A1 | 7/2011 | Ji et al. |
| 2020/0399732 A1* | 12/2020 | Kataoka ................. C21D 6/008 |

FOREIGN PATENT DOCUMENTS

| JP | 64-62417 A | 3/1989 |
| JP | 7-118750 A | 5/1995 |
| JP | 7-278668 A | 10/1995 |
| JP | 7-278669 A | 10/1995 |
| JP | 2002-60843 A | 2/2002 |
| JP | 2002-173715 A | 6/2002 |
| JP | 2003-3213 A | 1/2003 |
| JP | 2003-41320 A | 2/2003 |
| JP | 2003-55717 A | 2/2003 |
| JP | 2003-247021 A | 9/2003 |
| JP | 2008-1980 A | 1/2008 |

(Continued)

OTHER PUBLICATIONS

"Glossary of Metallurgical and Metalworking Terms," Metals Handbook, ASM Handbooks Online, ASM International, 2002, pp. 1, 173, 176, 177, 206, 257 (6 pages total). (Year: 2002).*
Gulyaev, "Metallurgy," Science of Metals, 1986, pp. 88-99 (8 pages total).
Kuznetsov, Great Explanatory Dictionary of Russian Language, Norint, 1998, p. 1249 (3 pages total).
Russian Office Action and Search Report for Russian Application No. 2021123080, dated Jan. 19, 2022, with English translation.
Sorokin et al., "Intermet Engineering," Steels and Alloys, 2001, p. 10 (3 pages total).

(Continued)

Primary Examiner — Vanessa T. Luk
(74) Attorney, Agent, or Firm — Birch, Stewart, Kolasch & Birch, LLP

(57) ABSTRACT

This manufacturing method of a grain-oriented electrical steel sheet is a manufacturing method of a grain-oriented electrical steel sheet having no forsterite film, in which in a decarburization annealing process, a cold-rolled steel sheet is (i-1) heated at an average heating rate (HR1) of 40 to 500° C./sec in a temperature range of 550° C. or higher and lower than 720° C., (i-2) heated at an average heating rate (HR2), which is 5 to 50° C./sec, in a temperature range of 720° C. to T1° C. (770° C.≤T1 (° C.)≤900° C.), and (ii) retained at the temperature of T1° C. for 50 to 1000 seconds to make an amount of C 25 ppm or less in an atmosphere of an oxygen partial pressure (P1) which is 0.0010 to 0.20.

6 Claims, No Drawings

(56) References Cited

FOREIGN PATENT DOCUMENTS

JP    2011-518253 A    6/2011

OTHER PUBLICATIONS

"Cold-rolled grain-oriented electrical steel strip and sheet delivered in the fully-processed state", JIS C 2553, 2019, total 17 pages.
"Iron and steel—Determination of carbon content—Part 4: Infrared absorption method after combustion in a furnace with preheating or peak separating", JIS G 1211-4, 2011, total 12 pages.

* cited by examiner

MANUFACTURING METHOD OF GRAIN-ORIENTED ELECTRICAL STEEL SHEET

TECHNICAL FIELD

The present invention relates to a manufacturing method of a grain-oriented electrical steel sheet used as an iron core material for a transformer, particularly a manufacturing method of a grain-oriented electrical steel sheet having excellent decarburization properties and not having a forsterite film.

Priority is claimed on Japanese Patent Application No. 2019-005129 filed in Japan on Jan. 16, 2019, the content of which is incorporated herein by reference.

BACKGROUND ART

A grain-oriented electrical steel sheet is an electrical steel sheet containing 7% or less of Si and formed of grains highly aligned in the {110}<001> orientation (hereinafter, Goss orientation), and is mainly used as an iron core material for a transformer.

High alignment in the Goss orientation in grain-oriented electrical steel sheets is realized by utilizing a grain growth phenomenon called secondary recrystallization. Grain-oriented electrical steel sheets are required to have a high magnetic flux density (represented by a magnetic flux density B8 value at a magnetic field intensity of 800 A/m) and low iron loss (represented by a $W_{17/50}$ value) as magnetic characteristics. Particularly, in recent years, there has been an increasing demand for reducing power loss from the perspective of energy saving.

In grain-oriented electrical steel sheets, magnetic domains change according to domain wall motion under an alternating magnetic field. When the domain wall motion is smoothly performed, it is effective in improving iron loss. However, when movement of the magnetic domains is observed, there are some magnetic domains that do not move, and in order to further reduce an iron loss value of a grain-oriented electrical steel sheet, it is important to eliminate a pinning effect from interfacial irregularities due to a forsterite ($Mg_2SiO_4$)-based film (hereinafter referred to as "glass film" in some cases) on a surface of the steel sheet that hinders movement of the magnetic domains.

In order to eliminate such a pinning effect, it is effective not to form a glass film on a surface of the steel sheet that hinders movement of magnetic domains, and as methods thereof, Patent Documents 1 to 10 disclose that surface smoothing can be achieved after final annealing by controlling a dew point of decarburization annealing such that Fe-based oxides ($Fe_2SiO_4$, FeO, or the like) are not formed in an oxide layer formed during the decarburization annealing, and using a material such as alumina that does not react with silica as an annealing separator.

However, generally, since the decarburization reaction is a chemical reaction between water vapor in the atmosphere and solid solution carbon in the steel sheet, there is a problem that decarburization properties deteriorate when an oxygen partial pressure reduces. For example, Patent Document 10 proposes a method of performing intermediate annealing in an atmosphere with an oxygen partial pressure of 0.50 to 0.88 after first cold rolling to promote decarburization, and then performing a second cold rolling to implement decarburization annealing in a range of an oxygen partial pressure of 0.0001 to 0.2.

By this method, generation of Fe-based oxides can be suppressed more strongly while securing satisfactory decarburization properties, but the cold rolling and the annealing are performed twice each, and this causes a significant problem in cost from an industrial perspective.

Patent Document 6 proposes a technology for improving decarburization properties, in which decarburization annealing is separated into an initial stage and a latter stage and is implemented by dividing a soaking range of the initial stage and the latter stage into two steps of T1 (° C.) represented by 770° C.≤T1≤860° C. and T2 (° C.) represented by T1+10≤T2≤950° C. However, since a lower limit value of an oxygen partial pressure assumed in Patent Document 6 is about 0.01, there has been a problem in that decarburization properties cannot be secured under a lower oxygen partial pressure, and particularly, difficulty with respect to decarburization properties of a thick material such as a final sheet thickness of 0.23 mm or more is particularly significant.

CITATION LIST

Patent Document

[Patent Document 1] Japanese Unexamined Patent Application, First Publication No. S64-062417
[Patent Document 2] Japanese Unexamined Patent Application, First Publication No. H07-118750
[Patent Document 3] Japanese Unexamined Patent Application, First Publication No. H07-278668
[Patent Document 4] Japanese Unexamined Patent Application, First Publication No. H07-278669
[Patent Document 5] Japanese Unexamined Patent Application, First Publication No. 2002-173715
[Patent Document 6] Japanese Unexamined Patent Application, First Publication No. 2003-055717
[Patent Document 7] Japanese Unexamined Patent Application, First Publication No. 2003-003213
[Patent Document 8] Japanese Unexamined Patent Application, First Publication No. 2003-041320
[Patent Document 9] Japanese Unexamined Patent Application, First Publication No. 2003-247021
[Patent Document 10] Published Japanese Translation No. 2011-518253 of the PCT International Publication

SUMMARY OF THE INVENTION

Problems to be Solved by the Invention

In view of the problems in the conventional technologies, it is an objective of the present invention to provide a manufacturing method of a grain-oriented electrical steel sheet having excellent decarburization properties for suitably reducing a residual amount of carbon and realizing low iron loss even when a sheet thickness is large in manufacturing a final-annealed grain-oriented electrical steel sheet manufactured by removing a glass film by a method such as pickling or intentionally preventing generation thereof, that is, a grain-oriented electrical steel sheet not having a forsterite film.

Means for Solving the Problem

In order to solve the above-described problems, the present inventors have intensively researched a manufacturing method for suitably reducing a residual amount of carbon and realizing low iron loss even when a sheet thickness is large in a grain-oriented electrical steel sheet that does not have a forsterite film.

As a result, it has been found that a residual amount of carbon can be suitably reduced and low iron loss can be realized in a manufactured grain-oriented electrical steel sheet by strictly controlling a decarburization annealing process.

The present invention has been made on the basis of the above-described findings, and the gist thereof is as follows.

(1) A manufacturing method of a grain-oriented electrical steel sheet including a hot rolling process in which a steel piece containing 0.10% by mass or less of C, 0.80 to 7.00% by mass of Si, 0.01 to 0.07% by mass of acid-soluble Al, 0.012% by mass or less of N, 1.00% by mass or less of Mn, and 0.08% by mass or less of S, and including a remainder of Fe and impurities is hot-rolled into a hot-rolled steel sheet, an annealing process in which the hot-rolled steel sheet is annealed, a pickling process in which the hot-rolled steel sheet after the annealing process is pickled, a cold rolling process in which the hot-rolled steel sheet after the pickling process is cold-rolled into a cold-rolled steel sheet, a decarburization annealing process in which the cold-rolled steel sheet is decarburized, and a final annealing process in which the steel sheet after the decarburization annealing process is final-annealed, in which the decarburization annealing process includes (i-1) a first heat treatment of heating at an average heating rate HR1, which is 40° C./sec to 500° C./sec, in a temperature range of 550° C. or higher and lower than 720° C., (i-2) a second heat treatment of heating at an average heating rate HR2, which is 5 to 50° C./sec, in a temperature range of 720° C. or higher and a temperature T1° C. or lower that satisfies the following expression (2) following the first heat treatment, and (ii) a first annealing treatment of retaining the temperature T1° C. for 50 to 1000 seconds following the second heat treatment, the first heat treatment, the second heat treatment, and the first annealing treatment are performed in an atmosphere of an oxygen partial pressure P1 satisfying the following expression (1), and an amount of C in the steel sheet after the first annealing treatment is 25 ppm or less.

$$0.0010 \leq P1 \leq 0.20 \quad (1)$$

$$770 \leq T1 \ (° \text{C.}) \leq 900 \quad (2)$$

(2) In the manufacturing method of a grain-oriented electrical steel sheet according to (1) described above, the decarburization annealing process may further include a second annealing treatment of retaining a temperature T2° C. satisfying the following expression (4) for 3 to 500 seconds in an atmosphere of an oxygen partial pressure P2 satisfying the following expression (3) after the first annealing treatment.

$$P2<P1 \quad (3)$$

$$960 \geq T2 \geq T1+10 \quad (4)$$

(3) The manufacturing method of a grain-oriented electrical steel sheet according to (2) described above may further include a third heat treatment between the first annealing treatment and the second annealing treatment, in which the third heat treatment performs heating at an average heating rate HR3, which is 5 to 50° C./sec, in a temperature range from T1° C. to T2° C.

(4) In the manufacturing method of a grain-oriented electrical steel sheet according to any one of (1) to (3) described above, the steel piece may contain one or more of 0.01 to 0.50% by mass of Cr, 0.01 to 0.50% by mass of Cu, and 0.01 to 0.02% by mass of Sn.

(5) The manufacturing method of a grain-oriented electrical steel sheet according to any one of (1) to (4) described above may further include a nitriding treatment process of nitriding the steel sheet after the decarburization annealing process between the decarburization annealing process and the final annealing process, in which the steel sheet after the nitriding treatment process is final-annealed in the final annealing process.

Effects of the Invention

According to the present invention, in the manufacturing method of a grain-oriented electrical steel sheet having no forsterite film by intentionally preventing generation of Fe-based oxides on a surface of the steel sheet by annealing in an atmosphere of a low oxygen partial pressure in the decarburization annealing process after the cold rolling, the decarburization annealing can be stably performed without going through two or more instances of cold rolling including an intermediate annealing even in an atmosphere of a low oxygen partial pressure in which generation of Fe-based oxides is suppressed. As a result, a residual amount of carbon can be suitably reduced and low iron loss can be realized even when a sheet thickness is large.

Embodiments for Implementing the Invention

A manufacturing method of a grain-oriented electrical steel sheet having excellent decarburization properties according to one embodiment of the present invention (hereinafter, referred to as "the present manufacturing method" in some cases) includes a hot rolling process in which a steel piece containing 0.10% by mass or less of C, 0.80 to 7.00% by mass of Si, 0.01 to 0.07% by mass of acid-soluble Al, 0.012% by mass or less of N, 1.00% by mass or less of Mn, and 0.08% by mass or less of S, and including a remainder of Fe and impurities is hot-rolled into a hot-rolled steel sheet, an annealing process in which the hot-rolled steel sheet is annealed, a pickling process in which the hot-rolled steel sheet after the annealing process is pickled, a cold rolling process in which the hot-rolled steel sheet after the pickling process is cold-rolled into a cold-rolled steel sheet, a decarburization annealing process in which the cold-rolled steel sheet is decarburized, and a final annealing process in which the steel sheet after the decarburization annealing process is final-annealed, wherein the decarburization annealing process includes (i-1) a first heat treatment of heating at an average heating rate HR1, which is 40 to 500° C./sec, in a temperature range of 550° C. or higher and lower than 720° C.; (i-2) a second heat treatment of heating at an average heating rate HR2, which is 5 to 50° C./sec, in a temperature range of 720° C. or higher and a temperature range T1° C. or lower that satisfies the following expression (2) following the first heat treatment; and (ii) a first annealing treatment of retaining the temperature at T1° C. for 50 to 1000 seconds following the second heat treatment, the first heat treatment, the second heat treatment, and the first annealing treatment are performed in an atmosphere of an oxygen partial pressure P1 satisfying the following expression (1), and an amount of C in the steel sheet after the first annealing treatment is 25 ppm or less.

$$0.0010 \leq P1 \leq 0.20 \quad (1)$$

$$770 \leq T1 \ (° \text{C.}) \leq 900 \quad (2)$$

Hereinafter, the present manufacturing method will be described. In the present embodiment, a numerical limitation range represented using "to" means a range including numerical values stated before and after "to" as the lower limit value and the upper limit value.

First, the reason for limiting a chemical composition of a steel piece (hereinafter, referred to as "the present steel piece" in some cases) for manufacturing an electrical steel sheet to be subjected to hot rolling in the present manufacturing method will be described. Hereinafter, "%" related to a chemical composition means "mass %" with respect to a total mass of the steel piece (more strictly speaking, a steel piece sample used for an analysis of the chemical composition).

<Chemical Composition>

C: 0.10% or Less

When a C content exceeds 0.10%, since the steel undergoes phase transformation during secondary recrystallization annealing, secondary recrystallization does not proceed sufficiently, and a satisfactory magnetic flux density and iron loss characteristics cannot be obtained, the C content is set to 0.10% or less. From the perspective of reducing iron loss, the C content is preferably 0.08% or less, and more preferably 0.06% or less. Since a detection limit of C is about 0.001%, 0.001% is a practical lower limit in a practical steel sheet.

Si: 0.80 to 7.00%

When a Si content is less than 0.80%, since the steel undergoes phase transformation during the secondary recrystallization annealing, the secondary recrystallization does not proceed sufficiently, and a satisfactory magnetic flux density and iron loss characteristics cannot be obtained, the Si content is set to 0.80% or more. The Si content is preferably 1.00% or more, more preferably 2.50% or more, and still more preferably 3.00% or more.

On the other hand, when the Si content exceeds 7.00%, since the steel sheet is embrittled and passability in the manufacturing process is significantly deteriorated, the Si content is set to 7.00% or less. The Si content is preferably 4.00% or less, and more preferably 3.75% or less.

Acid-Soluble Al: 0.01 to 0.07%

In the electrical steel sheet of the present invention, acid-soluble Al (sol. Al) is an indispensable element as an inhibitor in the secondary recrystallization. That is, the acid-soluble Al is an element that forms AlN and stably causes the secondary recrystallization.

When an acid-soluble Al content is less than 0.01%, since sufficient AlN that functions as an inhibitor is not generated, the secondary recrystallization is insufficient, and iron loss characteristics are not improved, the acid-soluble Al content is set to 0.01% or more. The acid-soluble Al content is preferably 0.015% or more, and more preferably 0.020% or more.

On the other hand, when the acid-soluble Al content exceeds 0.07%, since the steel sheet is embrittled and the embrittlement is significant particularly in the electrical steel sheet of the present invention having a large amount of Si, the acid-soluble Al content is preferably set to 0.07% or less. The acid-soluble Al content is preferably 0.05% or less, and more preferably 0.03% or less.

N: 0.012% or Less

When an N content exceeds 0.012%, since blisters (voids) are generated in the steel sheet during cold rolling, a strength of the steel sheet increases, and passability during manufacturing deteriorates, the N content is set to 0.012% or less. The N content is preferably 0.010% or less, and more preferably 0.009% or less.

On the other hand, in order for N to combine with Al to form AlN that functions as an inhibitor, the N content is preferably 0.004% or more. The N content is more preferably 0.006% or more.

Mn: 1.00% or Less

When a Mn content exceeds 1.00%, since the steel undergoes phase transformation during the secondary recrystallization annealing, the secondary recrystallization does not proceed sufficiently, and a satisfactory magnetic flux density and iron loss characteristics cannot be obtained, the Mn content is set to 1.00% or less. The Mn content is preferably 0.50% or less, and more preferably 0.20% or less.

MnS can be utilized as an inhibitor during the secondary recrystallization, but when AlN is utilized as an inhibitor, MnS is not indispensable, and therefore a lower limit of the Mn content includes 0%. When MnS is utilized as an inhibitor, the Mn content is 0.02% or more. The Mn content is preferably 0.05% or more, and more preferably 0.07% or more.

S: 0.08% or Less

When a S content exceeds 0.08%, hot brittleness makes the hot rolling significantly difficult, and therefore the S content is set to 0.08% or less. The S content is preferably 0.04% or less, and more preferably 0.03% or less.

When AlN is utilized as an inhibitor, MnS is not indispensable, and therefore a lower limit of the S content includes 0%, but when MnS is utilized as an inhibitor during the secondary recrystallization, the S content is set to 0.005% or more. The S content is preferably 0.01% or more, and more preferably 0.02% or more.

Also, a portion of S may be substituted with Se or Sb, and in that case, a value converted by $Seq=S+0.406Se$ or $Seq=S+0.406Sb$ is used.

In addition to the above-described elements, the electrical steel sheet of the present invention may contain one or more types of the following elements to improve characteristics of the electrical steel sheet of the present invention.

Cr: 0.01 to 0.50%

Cr is an element that improves a primary recrystallization texture, stabilizes secondary recrystallization, and brings about an effect of reducing iron loss. Since the effect of improving the texture cannot be sufficiently obtained when a Cr content is less than 0.01%, the Cr content is set to 0.01% or more. The Cr content is preferably 0.03% or more, and more preferably 0.05% or more.

On the other hand, when the Cr content exceeds 0.50%, since Cr combines with O to form a $Cr_2O_3$ film and this causes deterioration in decarburization properties, the Cr content is set to 0.50% or less. The Cr content is preferably 0.30% or less, and more preferably 0.20% or less.

Cu: 0.01 to 0.50%

As in Cr, Cu is an element that improves the primary recrystallization texture, stabilizes secondary recrystallization, and brings about an effect of reducing iron loss. Since the effect of improving the texture cannot be sufficiently obtained when a Cu content is less than 0.01%, the Cu content is set to 0.01% or more. The Cu content is preferably 0.03% or more, and more preferably 0.05% or more.

On the other hand, when the Cu content exceeds 0.50%, the steel sheet is embrittled during the hot rolling, and thus the Cu content is set to 0.50% or less. The Cu content is preferably 0.20% or less, more preferably 0.10% or less.

Sn: 0.01 to 0.20%

As in Cr and Cu, Sn is an element that improves the primary recrystallization texture. Since a smoothing effect of a surface of the steel sheet cannot be sufficiently obtained when the Sn content is less than 0.01%, the Sn content is set to 0.01% or more. The Sn content is preferably 0.02% or more, and more preferably 0.03% or more.

On the other hand, when the Sn content exceeds 0.20%, the secondary recrystallization is unstable, the magnetic characteristics deteriorate, and therefore the Sn content is set to 0.20% or less. The Sn content is preferably 0.15% or less, and more preferably 0.10% or less.

The remainder of the chemical composition of the present steel piece is Fe and impurities, but may contain trace elements such as Mo, W, In, Bi, Sb, Ag, Te, Ce, V, Co, Ni, Se, Re, Os, Nb, Zr, Hf, Ta, Y, and La in a total of 5.0% or less, and preferably 2.0% or less instead of a portion of the remainder iron, for the purpose of further improving the magnetic characteristics, improving characteristics required for structural members such as a strength, corrosion resistance, and fatigue characteristics, improving castability and passability, and improving productivity due to use of scraps, or the like. Impurities include unavoidable impurities that are inevitably mixed with the steel piece during the manufacturing process of the steel piece. Elements other than the elements listed above may be added to the steel piece as impurities within a range in which effects of the present embodiment are not impaired.

The chemical composition of the steel piece (or a base steel sheet in the grain-oriented electrical steel sheet) described above in detail may be measured using a general analysis method. For example, steel components may be measured using an inductively coupled plasma-atomic emission spectrometry (ICP-AES). Further, C and S may be measured using a combustion-infrared absorption method, N may be measured using an inert gas fusion-thermal conductivity method, and O may be measured using an inert gas fusion-nondispersive infrared absorption method.

Next, the present manufacturing method will be described.

<Manufacturing Method>

A manufacturing method of a grain-oriented electrical steel sheet having excellent decarburization properties according to the present embodiment includes a hot rolling process in which a steel piece containing 0.10% by mass or less of C, 0.80 to 7.00% by mass of Si, 0.01 to 0.07% by mass of acid-soluble Al, 0.012% by mass or less of N, 1.00% by mass or less of Mn, and 0.08% by mass or less of S and including a remainder of Fe and impurities is hot-rolled into a hot-rolled steel sheet, an annealing process in which the hot-rolled steel sheet is annealed, a pickling process in which the hot-rolled steel sheet after the annealing process is pickled, a cold rolling process in which the hot-rolled steel sheet after the pickling process is cold-rolled into a cold-rolled steel sheet, a decarburization annealing process in which the cold-rolled steel sheet is decarburized, and a final annealing process in which the steel sheet after the decarburization annealing process is final-annealed.

Here, the decarburization annealing process is a process of decarburizing the cold-rolled steel sheet and controlling a grain size to a size preferable for the secondary recrystallization (a grain size before the secondary recrystallization is referred to as a primary recrystallized grain size).

The decarburization annealing process of the present manufacturing method includes (i-1) a first heat treatment of heating at an average heating rate HR1, which is 40 to 500° C./sec, in a temperature range of 550° C. or higher and lower than 720° C., (i-2) a second heat treatment of heating at an average heating rate HR2, which is 5 to 50° C./sec, in a temperature range of 720° C. or higher and a temperature T1° C. or lower that satisfies the following expression (2) following the first heat treatment, and (ii) a first annealing treatment of retaining the temperature at T1° C. for 50 to 1000 seconds following the second heat treatment. Also, the first heat treatment, the second heat treatment, and the first annealing treatment are performed in an atmosphere of an oxygen partial pressure P1 satisfying the following expression (1). Further, an amount of C in the steel sheet after the first annealing treatment is 25 ppm or less.

$$0.0010 \leq P1 \leq 0.20 \tag{1}$$

$$770 \leq T1 \ (^\circ C.) \leq 900 \tag{2}$$

Hereinafter, important control factors will be described.

Oxygen partial pressure P1 in annealing atmosphere: 0.0010 or more and 0.20 or less In the decarburization annealing, when an oxide film (for example, an oxide film derived from Mn or Si) is generated on a surface of the steel sheet, a decarburization reaction is hindered, and therefore it is important to control generation of the oxide film.

Factors of controlling generation of the oxide film include an oxygen partial pressure of the atmosphere in addition to a heating rate (to be described below), and a retention temperature and a retention time (to be described below). Since the oxide film is due to an oxidation reaction between metal atoms and oxygen, generation behavior of the oxide film is particularly sensitive to the oxygen partial pressure (oxidation degree) in an annealing atmosphere.

The oxygen partial pressure (oxidation degree) is defined as a water vapor ($H_2O$) partial pressure divided by a hydrogen ($H_2$) partial pressure. That is, an atmosphere with a large oxygen partial pressure is an atmosphere with a high water vapor partial pressure. Since decarburization proceeds by a reaction of $C+H_2O \rightarrow H_2+CO$, the oxygen partial pressure is preferably large.

The oxygen partial pressure P1 in the decarburization annealing atmosphere of the present manufacturing method is an oxygen partial pressure satisfying the above-described expression (1).

When the oxygen partial pressure P1 is less than 0.0010, dense $SiO_2$ of an external oxidation type is rapidly formed to hinder the decarburization reaction, and therefore the oxygen partial pressure P1 is set to 0.0010 or more. The oxygen partial pressure P1 is preferably 0.010 or more.

An upper limit of the oxygen partial pressure is not particularly limited from the perspective of promoting the decarburization reaction, but when the oxygen partial pressure P1 exceeds 0.20, iron-based oxides having an action that suppresses proceeding of the secondary recrystallization are easily generated on a surface of the steel sheet, and therefore the oxygen partial pressure P1 is set to 0.20 or less. The oxygen partial pressure P1 is preferably 0.15 or less.

(i-1) First Stage Heating (Referred to as First Heat Treatment in Some Cases)

Heating temperature range: 550° C. or higher and lower than 720° C.

Average heating rate HR1: 40° C./sec or faster and 500° C./sec or slower

Generation behavior of $SiO_2$ that hinders the decarburization reaction depends not only on the oxygen partial pressure of the atmosphere but also on the heating rate. Therefore, it is important that heating in the decarburization annealing goes through a thermal cycle that avoids generation of $SiO_2$ as much as possible.

Therefore, the average heating rate HR1 in the temperature range of 550° C. or higher, which is a temperature range of generating $SiO_2$, is set to 40° C./sec or faster. The average heating rate HR1 is preferably 70° C./sec or faster. When the heating rate is faster, it is more preferable for decarburization, but if the heating rate is too fast, there is a likelihood that a temperature of the steel sheet may overshoot (exceed an upper limit value of T1). When the temperature of the steel sheet overshoots, grains in the primary recrystallized grain texture become coarse and the secondary recrystallization becomes defective. Therefore, the heating rate is set to 500° C./sec or slower. The heating rate is preferably 200° C./sec or slower.

In order to make sure that a temperature reached by heating at the heating rate of the average heating rate HR1 of 40° C./sec or faster and 500° C./sec or slower does not exceed the temperature T1° C. that satisfies the above-described expression (2), a temperature range to which the above-described heating rate is applied is set to lower than 720° C. (<770° C. [lower limit of the temperature T1° C.]). That is, the heating temperature range heated at the average heating rate HR1 is set to 550° C. or higher and lower than 720° C. Further, "average heating rate" at each stage in the present embodiment can be obtained by dividing a temperature range (upper limit value–lower limit value) at each stage by a time required for heating at each stage. Further, in measuring the average heating rate of the first stage heating, an upper limit value of the first stage heating is set to 720° C. for convenience.

(i-2) Second Stage Heating (Referred to as Second Heat Treatment in Some Cases)

Heating temperature range: 720° C. or higher and the temperature T1° C. or lower that satisfies the above-described expression (2)

Average heating rate HR2: 5° C./sec or faster and 50° C./sec or slower

The heating rate in the heating temperature range of 720° C. or higher and the temperature T1° C. or lower is also important. It is necessary to employ a heating rate which makes sure that a temperature reached by heating does not exceed the temperature T1° C. that satisfies the above-described expression (2). Therefore, the average heating rate HR2 in the temperature range of 720° C. or higher and the temperature T1° C. or lower that satisfies the above-described expression (2) is set to 5° C./sec or faster and 50° C./sec or slower.

Since productivity decreases when the average heating rate HR2 is slower than 5° C./sec, the average heating rate HR2 is set to 5° C./sec or faster. The average heating rate HR2 is preferably 7° C./sec or faster. On the other hand, since there are cases in which a temperature reached by heating exceeds the temperature T1° C. when the average heating rate HR2 exceeds 50° C./sec, the average heating rate HR2 is set to 50° C./sec or slower. The average heating rate HR2 is preferably 20° C./sec or slower.

(ii) Decarburization Annealing (Referred to as First Annealing Treatment in Some Cases)

Annealing temperature T1: Temperature T1° C. (770° C. or higher and 900° C. or lower) that satisfies the above-described expression (2)

Retention time: 50 seconds or longer and 1000 seconds or shorter

Amount of C in steel sheet: 25 ppm or less

The decarburization reaction highly depends on a diffusion rate of carbon in a steel, that is, on temperature and time. The decarburization reaction does not easily proceed when the annealing temperature T1 is 770° C. or lower, and therefore the annealing temperature T1 is set to 770° C. or higher. The annealing temperature T1 is preferably 800° C. or higher, and more preferably 810° C. or higher.

On the other hand, when the annealing temperature T1 exceeds 900° C., since an oxide film derived from Mn or Si is generated on a surface of the steel sheet, the decarburization reaction shifts from diffusion control to phase boundary control, and proceeding of the decarburization reaction is hindered, the annealing temperature T1 is set to 900° C. or lower. The annealing temperature T1 is preferably 870° C. or lower, and more preferably 850° C. or lower.

Also, in the decarburization annealing, the retention time is also important in addition to the annealing temperature. Therefore, the retention time at T1° C. is set to 50 seconds or longer and 1000 seconds or shorter. When the retention time is less than 50 seconds, the decarburization reaction does not proceed sufficiently and the remaining C causes magnetic aging, and therefore the retention time is set to 50 seconds or longer. The retention time is preferably 70 seconds or longer, and more preferably 100 seconds or longer.

On the other hand, when the retention time exceeds 1000 seconds, the primary recrystallized grains become coarse and this causes a defect in the secondary recrystallization, and therefore the retention time is set to 1000 seconds or shorter. The retention time is preferably 500 seconds or shorter, and more preferably 200 seconds or shorter.

In the present manufacturing method, in order to further promote the decarburization reaction, following the above-described annealing (the first annealing treatment), it is effective to perform a second annealing treatment in which a temperature T2° C. satisfying the following expression (4) is retained for 3 seconds or longer and 500 seconds or shorter in an atmosphere of an oxygen partial pressure P2 that satisfies the following expression (3).

$$P2<P1 \tag{3}$$

$$960 \geq T2 \geq T1+10 \tag{4}$$

The decarburization rate at the temperature T1° C. decreases with time and the decarburization reaction finally reaches a thermal equilibrium state. If it is heated to a higher temperature when the decarburization reaction has reached the thermal equilibrium state, the decarburization reaction can be proceeded again. Therefore, in order to more suitably reduce a residual amount of carbon in the grain-oriented electrical steel sheet being manufactured, it is preferable to perform the second annealing treatment following the first annealing treatment in the present manufacturing method.

Second Annealing Treatment

Oxygen partial pressure P2 in annealing atmosphere: less than P1 (expression (3) described above)

Annealing temperature T2: T1+10° C. or higher and 960° C. or lower (expression (4) described above)

Retention time: 3 seconds or longer and 500 seconds or shorter

When the oxygen partial pressure P2, which is the annealing atmosphere of the second annealing treatment, is made to be the same as the oxygen partial pressure P1 (0.0010 or more and 0.20 or less) of the annealing atmosphere of the first annealing treatment, an oxide film is generated on a surface of the steel sheet, and therefore the oxygen partial pressure P2 in the annealing atmosphere of the second annealing treatment is set to be less than the oxygen partial pressure P1. The oxygen partial pressure P2 is preferably P1×0.1 or less.

Since the oxygen partial pressure P2 in the annealing atmosphere of the second annealing treatment may be appropriately set within a range in which the decarburization reaction is promoted while suppressing generation of an oxide film on a surface of the steel sheet at an oxygen partial pressure less than P1, a lower limit thereof is not particularly limited, but the oxygen partial pressure is preferably P1×0.01 or more from the perspective of reliably suppressing generation of the oxide film.

When the annealing temperature T2° C. of the second annealing treatment is lower than T1 (770° C. or higher and 900° C. or lower)+10° C., the decarburization reaction does not proceed again, and therefore the annealing temperature T2° C. of the second annealing treatment is T1° C. (770° C. or higher and 900° C. or lower)+10° C. or higher. The annealing temperature T2° C. is preferably T1° C. (770° C. or higher and 900° C. or lower)+20° C. or higher.

There is no upper limit to the annealing temperature T2° C. in terms of promoting the decarburization reaction, but the annealing temperature T2° C. is set to 960° C. or lower from the perspective of controlling grain sizes. The annealing temperature T2° C. is preferably 950° C. or lower, and more preferably T1° C+60° C. or lower.

Since the second annealing treatment is an additional annealing treatment following the first stage annealing treatment, the retention time is preferably a short period of time from the perspective of productivity. When the retention time is shorter than 3 seconds, the decarburization reaction hardly proceeds and an effect of the second annealing treatment cannot be obtained, and therefore the retention time is set to 3 seconds or longer. The retention time is preferably 10 seconds or longer.

On the other hand, when the retention time exceeds 500 seconds, the effect of the second annealing treatment is saturated and the productivity decreases, and therefore the retention time is set to 500 seconds or shorter. The retention time is preferably 100 seconds or shorter.

When proceeding from the first annealing treatment to the second annealing treatment, it is necessary to suppress generation of an oxide film on a surface of the steel sheet so that the decarburization reaction is not hindered. Therefore, an average heating rate HR3 in heating (referred to as a third heat treatment in some cases) from the temperature T1° C. of the first annealing treatment to the temperature T2° C. of the second annealing treatment is set to 5° C./sec or faster and 50° C./sec or slower.

When the average heating rate HR3 is slower than 5° C./sec, the temperature T2° C. of the second annealing treatment is not reached, and therefore the average heating rate HR3 is set to 5° C./sec or faster. The average heating rate HR3 is preferably 10° C./sec or faster. On the other hand, when the average heating rate HR3 exceeds 50° C./sec, since a temperature reached by the heating exceeds the temperature T2° C., the primary recrystallized grain size become coarse, causing a defect in the secondary recrystallization, and a magnetic flux density decreases, the average heating rate HR3 is set to 50° C./sec or slower. The average heating rate HR3 is preferably 20° C./sec or slower.

Nitriding Treatment

A nitriding treatment may be performed on the steel sheet after the decarburization annealing process. A method of the nitriding treatment is not particularly limited, and a method performed in an atmosphere gas having nitriding ability such as ammonia or the like can be exemplified. A treatment time and treatment conditions of the nitriding treatment are not particularly limited, and the nitriding treatment may be performed so that an amount of N in the steel sheet is 0.005% or more, and preferably, a ratio of (amount of N)/(amount of acid-soluble Al) in the steel sheet is 2/3 or more.

This nitriding treatment process is particularly effective when the hot rolling process is performed after the steel piece is heated at a temperature of lower than 1300° C. (referred to as low temperature slab heating or medium temperature slab heating in some cases). On the other hand, when the hot rolling process is performed after the steel piece is heated at a temperature of 1300° C. or higher to almost completely dissolve fine precipitates called inhibitors (referred to as high temperature slab heating in some cases), the nitriding treatment process may not be performed.

As described above, in the present embodiment, the grain-oriented electrical steel sheet having no forsterite film is manufactured by intentionally preventing generation of Fe-based oxides on a surface of the steel sheet by annealing in an atmosphere of a low oxygen partial pressure in the decarburization annealing process after the cold rolling. Further, in the present embodiment, the decarburization annealing can be stably performed without going through two or more instances of cold rolling including an intermediate annealing even in an atmosphere of a low oxygen partial pressure in which generation of Fe-based oxides is suppressed by strictly controlling the decarburization annealing process. As a result, even when a sheet thickness is large (for example, when a sheet thickness is 0.23 mm or more), a residual amount of carbon can be suitably reduced and low iron loss can be realized. Further, a magnetic flux density (for example, a magnetic flux density B8 at a magnetic field intensity of 800 A/m) can be increased.

EXAMPLE

Hereinafter, technical contents of the present manufacturing method will be further described on the basis of examples of the present manufacturing method.

Further, conditions in the examples described below are condition examples employed for ascertaining feasibility and effects of the present invention, and the present invention is not limited to the condition examples. Also, the present invention can employ various conditions as long as the objective of the present invention is achieved without departing from the gist of the present invention.

Example 1

An ingot having the chemical composition shown in Table 1 was vacuum-melted and casted into a steel piece. The steel piece was heated to 1150° C. and subjected to hot rolling to obtain a hot-rolled steel sheet having a sheet thickness of 2.3 mm. The hot-rolled steel sheet was annealed at 1000 to 1100° C. for 2 minutes, pickled, and then subjected to cold rolling to obtain a cold-rolled steel sheet having a final sheet thickness of 0.23 to 0.30 mm.

TABLE 1

| | Steel No. | C | Si | Mn | Al | S | N | Others |
|---|---|---|---|---|---|---|---|---|
| Invention steel | A1 | 0.005 | 3.15 | 0.08 | 0.028 | 0.021 | 0.007 | |
| | A2 | 0.095 | 3.16 | 0.08 | 0.027 | 0.018 | 0.008 | |
| | A3 | 0.065 | 1.01 | 0.09 | 0.027 | 0.018 | 0.007 | |
| | A4 | 0.078 | 6.38 | 0.11 | 0.028 | 0.015 | 0.009 | |
| | A5 | 0.037 | 2.67 | 0.03 | 0.029 | 0.017 | 0.008 | |
| | A6 | 0.034 | 2.99 | 0.95 | 0.029 | 0.018 | 0.007 | |
| | A7 | 0.035 | 3.14 | 0.06 | 0.012 | 0.018 | 0.008 | |
| | A8 | 0.058 | 3.18 | 0.45 | 0.068 | 0.019 | 0.009 | |
| | A9 | 0.045 | 3.12 | 0.09 | 0.033 | 0.003 | 0.008 | |
| | A10 | 0.055 | 3.16 | 0.07 | 0.039 | 0.071 | 0.006 | |
| | A11 | 0.057 | 3.26 | 0.08 | 0.027 | 0.039 | 0.002 | |

TABLE 1-continued

| | Steel No. | C | Si | Mn | Al | S | N | Others |
|---|---|---|---|---|---|---|---|---|
| | A12 | 0.037 | 3.07 | 0.12 | 0.028 | 0.037 | 0.011 | |
| | A13 | 0.036 | 3.17 | 0.09 | 0.028 | 0.018 | 0.010 | |
| | A14 | 0.029 | 3.11 | 0.07 | 0.029 | 0.017 | 0.004 | |
| | A15 | 0.051 | 3.15 | 0.09 | 0.028 | 0.015 | 0.007 | Cr: 0.05 |
| | A16 | 0.055 | 3.22 | 0.17 | 0.029 | 0.012 | 0.006 | Cr: 0.14, Cu: 0.08 |
| | A17 | 0.059 | 3.45 | 0.08 | 0.029 | 0.014 | 0.007 | Cu: 0.32, Sn: 0.03 |
| Comparative steel | a1 | 0.135 | 3.05 | 0.09 | 0.029 | 0.018 | 0.009 | |
| | a2 | 0.032 | 0.77 | 0.08 | 0.029 | 0.015 | 0.008 | |
| | a3 | 0.048 | 7.12 | 0.12 | 0.027 | 0.019 | 0.007 | |
| | a4 | 0.037 | 3.17 | 1.21 | 0.028 | 0.017 | 0.006 | |
| | a5 | 0.045 | 3.11 | 0.08 | 0.008 | 0.015 | 0.008 | |
| | a6 | 0.042 | 3.07 | 0.09 | 0.087 | 0.014 | 0.007 | |
| | a7 | 0.056 | 3.17 | 0.07 | 0.029 | 0.091 | 0.009 | |
| | a8 | 0.034 | 3.26 | 0.12 | 0.028 | 0.018 | 0.015 | |

The cold-rolled steel sheet was subjected to decarburization annealing at 820° C. for 140 seconds in a wet gas containing hydrogen and nitrogen (P1=$P_{H_2O}/P_{H_2}$=0.10). The average heating rate HR1 in the temperature range of 550° C. or higher and lower than 720° C. was set to 80° C./sec, and the average heating rate HR2 in the temperature range of 720° C. or higher and 820° C. or lower (that is, T1: 820° C.) was set to 10° C./sec.

An annealing separator containing alumina as a main component was applied to the steel sheet after the decarburization annealing in a form of an aqueous slurry, and final annealing was performed. The final annealing was performed up to 1200° C. at a temperature rising rate of 15° C./hour in an atmosphere containing nitrogen, and the atmosphere was switched to hydrogen 100% at 1200° C. to perform annealing for 20 hours.

A sample for evaluation was taken from the secondary recrystallized steel sheet that had undergone the above processes, the sample was subjected to strain relief annealing at 800° C. for 2 hours in a dry gas atmosphere containing nitrogen and hydrogen, an aging treatment was performed at 150° C. for 300 hours in a nitrogen atmosphere thereafter, and then a magnetic flux density and iron loss were measured using a single sheet tester (SST), and furthermore a residual amount of carbon was analyzed.

Table 2 shows magnetic flux densities B8(T), iron loss ($W_{17/50}$), and residual amounts of carbon (ppm) after the aging treatment.

TABLE 2

| | No. | Steel No. | Residual amount of carbon [C] (ppm) | Magnetic flux density B8 (T) | Iron loss $W_{17/50}$ (W/Kg) | Sheet thickness (mm) |
|---|---|---|---|---|---|---|
| Invention example | B1 | A1 | 22 | 1.89 | 0.82 | 0.30 |
| | B2 | A2 | 21 | 1.91 | 0.81 | 0.30 |
| | B3 | A3 | 15 | 1.95 | 0.84 | 0.30 |
| | B4 | A4 | 18 | 1.89 | 0.77 | 0.30 |
| | B5 | A5 | 22 | 1.96 | 0.82 | 0.30 |
| | B6 | A6 | 23 | 1.90 | 0.79 | 0.30 |
| | B7 | A7 | 15 | 1.89 | 0.81 | 0.30 |
| | B8 | A8 | 18 | 1.89 | 0.80 | 0.30 |
| | B9 | A9 | 22 | 1.90 | 0.80 | 0.30 |
| | B10 | A10 | 21 | 1.91 | 0.81 | 0.30 |
| | B11 | A11 | 20 | 1.94 | 0.82 | 0.30 |
| | B12 | A12 | 22 | 1.93 | 0.81 | 0.30 |
| | B13 | A13 | 12 | 1.93 | 0.80 | 0.30 |
| | B14 | A14 | 9 | 1.92 | 0.82 | 0.30 |
| | B15 | A15 | 14 | 1.93 | 0.79 | 0.30 |
| | B16 | A16 | 14 | 1.94 | 0.75 | 0.30 |
| | B17 | A17 | 14 | 1.93 | 0.75 | 0.30 |
| | B18 | A17 | 17 | 1.95 | 0.74 | 0.27 |
| | B19 | A17 | 18 | 1.94 | 0.73 | 0.27 |
| | B20 | A17 | 19 | 1.94 | 0.73 | 0.23 |
| | B21 | A17 | 21 | 1.96 | 0.72 | 0.23 |
| Comparative example | b1 | a1 | 47 | 1.67 | — | 0.30 |
| | b2 | a2 | 19 | 1.55 | — | 0.30 |
| | b3 | a3 | — | — | — | 0.30 |
| | b4 | a4 | 23 | 1.49 | — | 0.30 |
| | b5 | a5 | 24 | 1.51 | — | 0.30 |
| | b6 | a6 | — | — | — | 0.30 |
| | b7 | a7 | — | — | — | 0.30 |
| | b8 | a8 | — | — | — | 0.30 |

The analysis of the residual amount of carbon was performed according to JIS G 1211-4: 2011. From the perspective of magnetic aging, a target residual amount of carbon was 25 ppm or less. The SST was performed according to JIS C 2553. The iron loss was evaluated by the iron loss $W_{17/50}$ (W/kg) at a frequency of 50 Hz and a maximum magnetic flux density of 1.7 T. A target for $W_{17/50}$ (W/kg) was 0.85 or less.

The magnetic flux density was evaluated by the magnetic flux density B8 at a magnetic field intensity of 800 A/m. The B8 was aimed at 1.88 T or higher, and the iron loss was not evaluated for a sample with the B8 less than 1.88 T. Also, for a steel sheet on which the cold rolling could not be performed, the residual amount of carbon was not analyzed, and the magnetic flux density and the iron loss were not evaluated. In the invention example, it is ascertained that the residual amount of carbon of 23 ppm or less, the magnetic flux density B8 of 1.89 T or more, and the iron loss $W_{17/50}$ (W/kg) of 0.84 or less have been obtained.

Example 2

An ingot having the chemical composition shown in Table 1 was vacuum-melted and casted into a steel piece. The steel piece was heated to 1150° C. and subjected to hot rolling to obtain a hot-rolled steel sheet having a sheet thickness of 2.3 mm. The hot-rolled steel sheet was annealed at 1000 to 1100° C. for 2 minutes, pickled, and then subjected to cold rolling to obtain a cold-rolled steel sheet having a final sheet thickness of 0.23 to 0.30 mm.

This cold-rolled steel sheet was subjected to decarburization annealing under the conditions shown in Table 3. HR1 is an average heating rate in a temperature range of 550° C. or higher and lower than 720° C., and HR2 is an average heating rate in a temperature range of 720° C. or higher and an annealing temperature T1° C. or lower. Also, the "retention time" in Table 3 represents a retention time at T1° C. during the decarburization annealing.

TABLE 3

| | No. | Steel No. | Decarburization anneal | | | | | Residual amount of carbon [C] (ppm) | Magnetic flux density B8 (T) | Iron loss $W_{17/50}$ (W/Kg) | Sheet thickness (mm) |
|---|---|---|---|---|---|---|---|---|---|---|---|
| | | | Oxygen partial pressure P1 | Retention temperature T1 (° C.) | Retention time (sec) | HR1 (° C./sec) | HR2 (° C./sec) | | | | |
| Invention example | C1 | A15 | 0.002 | 790 | 150 | 54 | 12 | 22 | 1.90 | 0.76 | 0.30 |
| | C2 | A15 | 0.186 | 788 | 140 | 55 | 10 | 18 | 1.91 | 0.77 | 0.30 |
| | C3 | A15 | 0.005 | 775 | 150 | 60 | 9 | 19 | 1.91 | 0.78 | 0.30 |
| | C4 | A15 | 0.008 | 880 | 140 | 56 | 9 | 18 | 1.92 | 0.78 | 0.30 |
| | C5 | A15 | 0.05 | 803 | 55 | 68 | 11 | 20 | 1.92 | 0.78 | 0.30 |
| | C6 | A15 | 0.075 | 806 | 150 | 55 | 12 | 19 | 1.90 | 0.76 | 0.30 |
| | C7 | A15 | 0.065 | 800 | 120 | 43 | 14 | 20 | 1.91 | 0.76 | 0.30 |
| | C8 | A15 | 0.08 | 807 | 120 | 120 | 6 | 13 | 1.93 | 0.75 | 0.30 |
| | C9 | A17 | 0.12 | 825 | 125 | 155 | 12 | 12 | 1.94 | 0.73 | 0.30 |
| | C10 | A17 | 0.11 | 820 | 120 | 150 | 13 | 17 | 1.95 | 0.71 | 0.27 |
| | C11 | A17 | 0.12 | 830 | 125 | 155 | 11 | 19 | 1.96 | 0.69 | 0.23 |
| | C12 | A15 | 0.11 | 825 | 995 | 65 | 10 | 18 | 1.92 | 0.77 | 0.30 |
| | C13 | A15 | 0.12 | 890 | 120 | 495 | 12 | 17 | 1.91 | 0.78 | 0.30 |
| | C14 | A15 | 0.12 | 775 | 120 | 60 | 45 | 18 | 1.92 | 0.77 | 0.30 |
| Comparative example | c1 | A15 | 0.0008 | 786 | 142 | 60 | 12 | 89 | 1.90 | 0.88 | 0.30 |
| | c2 | A15 | 0.235 | 795 | 143 | 59 | 15 | 77 | 1.91 | 0.89 | 0.30 |
| | c3 | A15 | 0.007 | 750 | 145 | 55 | 12 | 86 | 1.90 | 0.91 | 0.30 |
| | c4 | A15 | 0.008 | 920 | 147 | 47 | 15 | 77 | 1.89 | 0.91 | 0.30 |
| | c5 | A15 | 0.007 | 865 | 40 | 45 | 12 | 67 | 1.89 | 0.88 | 0.30 |
| | c6 | A15 | 0.007 | 860 | 1100 | 43 | 10 | 17 | 1.56 | — | 0.30 |
| | c7 | A15 | 0.009 | 871 | 155 | 30 | 20 | 89 | 1.90 | 0.87 | 0.30 |
| | c8 | A15 | 0.005 | 859 | 145 | 55 | 3 | 68 | 1.92 | 0.95 | 0.30 |
| | c9 | A15 | 0.007 | 910 | 120 | 600 | — | 73 | 1.87 | — | 0.30 |
| | c10 | A15 | 0.007 | 915 | 120 | 60 | 80 | 69 | 1.86 | — | 0.30 |

An annealing separator containing alumina as a main component was applied to the steel sheet after the decarburization annealing in a form of an aqueous slurry, and final annealing was performed. The final annealing was performed up to 1200° C. at a temperature rising rate of 15° C./hour in an atmosphere containing nitrogen, and the atmosphere was switched to hydrogen 100% at 1200° C. to perform annealing for 20 hours.

A sample of the evaluation table was taken from the secondary recrystallized steel sheet that had undergone the above processes, the sample was subjected to strain relief annealing at 800° C. for 2 hours in a dry gas atmosphere containing nitrogen and hydrogen, an aging treatment was performed at 150° C. for 300 hours in a nitrogen atmosphere thereafter, and then a magnetic flux density and iron loss were measured using the SST, and furthermore a residual amount of carbon was analyzed. A method of evaluating magnetism and a method of analyzing the residual amount of carbon are the same as those in Example 1.

Table 3 shows magnetic flux densities B8(T), iron loss ($W_{17/50}$), and residual amounts of carbon (ppm) after the aging treatment in combination. In the invention example, it is ascertained that the residual amount of carbon of 22 ppm or less, the magnetic flux density B8 of 1.90 T or more, and the iron loss $W_{17/50}$ (W/kg) of 0.78 or less have been obtained. Further, in comparative example c9, the average heating rate HR1 exceeded 500° C./sec, and a temperature of the steel sheet exceeded the upper limit value of T1 when it is heated at the average heating rate HR1. Therefore, the average heating rate HR2 could not be measured.

Example 3

An ingot having the chemical composition shown in Table 1 was vacuum-melted and casted into a steel piece. The steel piece was heated to 1150° C. and subjected to hot rolling to obtain a hot-rolled steel sheet having a sheet thickness of 2.3 mm. The hot-rolled steel sheet was annealed at 1000 to 1100° C. for 2 minutes, pickled, and then subjected to cold rolling to obtain a cold-rolled steel sheet having a final sheet thickness of 0.23 to 0.30 mm.

This cold-rolled steel sheet was subjected to decarburization annealing at T1=820° C. for 140 seconds in an annealing atmosphere of P1=0.10. At that time, heating up to T1 was performed at the average heating rate HR1 of 80° C./sec in the temperature range of 550° C. or higher and lower than 720° C. and was performed at the average heating rate HR2 of 10° C./sec in the temperature range of 720° C. or higher and 820° C. or lower.

The cold-rolled steel sheet was subjected to decarburization annealing at 820° C. for 140 seconds, and then subsequently subjected to a second annealing treatment under the conditions shown in Table 4 without lowering the retention temperature.

TABLE 4

| | No. | Steel No. | Second annealing treatment | | | | | Residual amount of carbon [C] (ppm) | Magnetic flux density B8 (T) | Iron loss $W_{17/50}$ (W/Kg) | Sheet thickness (mm) |
|---|---|---|---|---|---|---|---|---|---|---|---|
| | | | HR3 (° C./sec) | Oxygen partial pressure P2 | Retention temperature T2 (° C.) | Retention time (sec) | | | | | |
| Invention example | D1 | A15 | 6 | 0.056 | 845 | 150 | | 5 | 1.90 | 0.74 | 0.30 |
| | D2 | A15 | 45 | 0.035 | 850 | 140 | | 3 | 1.91 | 0.73 | 0.30 |

TABLE 4-continued

| | | | Second annealing treatment | | | | | |
|---|---|---|---|---|---|---|---|---|
| No. | Steel No. | HR3 (° C./sec) | Oxygen partial pressure P2 | Retention temperature T2 (° C.) | Retention time (sec) | Residual amount of carbon [C] (ppm) | Magnetic flux density B8 (T) | Iron loss $W_{17/50}$ (W/Kg) | Sheet thickness (mm) |
| D3 | A15 | 6 | 0.081 | 856 | 5 | 4 | 1.93 | 0.72 | 0.30 |
| D4 | A15 | 7 | 0.041 | 835 | 150 | 2 | 1.91 | 0.74 | 0.30 |
| D5 | A15 | 7 | 0.038 | 860 | 5 | 4 | 1.92 | 0.73 | 0.30 |
| D6 | A15 | 8 | 0.037 | 870 | 190 | 3 | 1.90 | 0.72 | 0.30 |
| D7 | A17 | 17 | 0.002 | 865 | 15 | 2 | 1.94 | 0.70 | 0.30 |
| D8 | A15 | 3 | 0.001 | 875 | 15 | 10 | 1.90 | 0.76 | 0.30 |
| D9 | A15 | 4 | 0.002 | 871 | 86 | 12 | 1.91 | 0.76 | 0.30 |
| D10 | A15 | 4 | 0.115 | 889 | 156 | 22 | 1.90 | 0.79 | 0.30 |
| D11 | A15 | 4 | 0.034 | 820 | 145 | 24 | 1.90 | 0.80 | 0.30 |
| D12 | A15 | 65 | 0.035 | 960 | 147 | 22 | 1.89 | 0.79 | 0.30 |
| D13 | A15 | 71 | 0.041 | 894 | 1 | 23 | 1.89 | 0.79 | 0.30 |
| D14 | A17 | 16 | 0.002 | 860 | 17 | 10 | 1.94 | 0.68 | 0.27 |
| D15 | A17 | 18 | 0.002 | 870 | 16 | 18 | 1.97 | 0.65 | 0.23 |
| D16 | A17 | 8 | 0.002 | 870 | 495 | 3 | 1.93 | 0.72 | 0.30 |

An annealing separator containing alumina as a main component was applied to the steel sheet after the second annealing treatment in a form of an aqueous slurry, and final annealing was performed. The final annealing was performed up to 1200° C. while raising the temperature at a temperature rising rate of 15° C./hour in an atmosphere containing nitrogen, and the atmosphere was switched to hydrogen 100% at 1200° C. to perform annealing for 20 hours.

A sample for evaluation was taken from the secondary recrystallized steel sheet that had undergone the above processes, the sample was subjected to strain relief annealing at 800° C. for 2 hours in a dry gas atmosphere containing nitrogen and hydrogen, an aging treatment was performed at 150° C. for 300 hours in a nitrogen atmosphere thereafter, and then a magnetic flux density and iron loss were measured using the SST, and furthermore a residual amount of carbon was analyzed. A method of evaluating magnetism and a method of analyzing the residual carbon are the same as those in example 1.

Table 4 shows magnetic flux densities B8(T), iron loss ($W_{17/50}$), and residual amounts of carbon (ppm) of the steel sheets after the aging treatment in combination. It is ascertained that the residual amount of carbon of 24 ppm or less, the magnetic flux density B8 of 1.89 T or more, and the iron loss $W_{17/50}$ (W/kg) of 0.80 or less have been obtained. Particularly, in invention examples D1 to D7 and D14 to D16 that satisfy preferable conditions of the second annealing treatment and the third heat treatment described in the present embodiment, the residual amount of carbon or the iron loss tended to be further reduced. Further, sheet thicknesses decreased in D14 and D15, and in this respect also, iron loss became satisfactory values.

Example 4

In Example 4, the same treatment as in invention examples D1 to D16 of example 3 was performed except that a nitriding treatment was performed between the second annealing treatment and the final annealing process. Here, the nitriding treatment was performed by retaining the steel sheet at 700 to 800° C. for 30 seconds in an ammonia gas atmosphere. The results are shown in Table 5. In any of the invention examples, the residual amount of carbon was 25 ppm or less, the magnetic flux density B8 was 1.88 T or more, and the iron loss $W_{17/50}$ (W/kg) was 0.85 or less.

TABLE 5

| | No. | Steel No. | Residual amount of carbon [C] (ppm) | Magnetic flux density B8 (T) | Iron loss $W_{17/50}$ (W/Kg) | Sheet thickness (mm) |
|---|---|---|---|---|---|---|
| Invention example | E1 | A15 | 6 | 1.91 | 0.75 | 0.30 |
| | E2 | A15 | 4 | 1.92 | 0.74 | 0.30 |
| | E3 | A15 | 5 | 1.92 | 0.73 | 0.30 |
| | E4 | A15 | 1 | 1.91 | 0.74 | 0.30 |
| | E5 | A15 | 3 | 1.91 | 0.74 | 0.30 |
| | E6 | A15 | 4 | 1.91 | 0.71 | 0.30 |
| | E7 | A17 | 3 | 1.93 | 0.72 | 0.30 |
| | E8 | A15 | 11 | 1.90 | 0.75 | 0.30 |
| | E9 | A15 | 13 | 1.91 | 0.76 | 0.30 |
| | E10 | A15 | 21 | 1.91 | 0.78 | 0.30 |
| | E11 | A15 | 23 | 1.90 | 0.79 | 0.30 |
| | E12 | A15 | 21 | 1.89 | 0.80 | 0.30 |
| | E13 | A15 | 24 | 1.90 | 0.79 | 0.30 |
| | E14 | A17 | 11 | 1.93 | 0.69 | 0.27 |
| | E15 | A17 | 17 | 1.96 | 0.65 | 0.23 |
| | E16 | A17 | 4 | 1.92 | 0.72 | 0.30 |

INDUSTRIAL APPLICABILITY

As described above, according to the present invention, in the manufacturing method of a grain-oriented electrical steel sheet having no forsterite film by intentionally preventing generation of Fe-based oxides on a surface of the steel sheet by annealing in an atmosphere of a low oxygen partial pressure in the decarburization annealing process after the cold rolling, the decarburization annealing can be stably performed without going through two or more instances of cold rolling including an intermediate annealing even in an atmosphere of a low oxygen partial pressure in which generation of Fe-based oxides is suppressed. Therefore, the present invention has high applicability in the electrical steel sheet manufacturing industry.

The invention claimed is:

1. A manufacturing method of a grain-oriented electrical steel sheet comprising:
    a hot rolling process in which a steel piece containing 0.10% by mass or less of C, 0.80 to 7.00% by mass of Si, 0.01 to 0.07% by mass of acid-soluble Al, 0.012% by mass or less of N, 1.00% by mass or less of Mn, and 0.08% by mass or less of S, and including a remainder of Fe and impurities is hot-rolled into a hot-rolled steel sheet;

an annealing process in which the hot-rolled steel sheet is annealed;

a pickling process in which the hot-rolled steel sheet after the annealing process is pickled;

a cold rolling process in which the hot-rolled steel sheet after the pickling process is cold-rolled into a cold-rolled steel sheet;

a decarburization annealing process in which the cold-rolled steel sheet is decarburized; and a final annealing process in which the steel sheet after the decarburization annealing process is final-annealed, wherein the decarburization annealing process includes:

(i-1) a first heat treatment of heating at an average heating rate HR1, which is 40 to 500° C./sec, in a temperature range of 550° C. or higher and lower than 720° C.;

(i-2) a second heat treatment of heating at an average heating rate HR2, which is 5 to 50° C./sec, in a temperature range of 720° C. or higher and a temperature T1° C. or lower that satisfies the following expression (2) following the first heat treatment; and (ii) a first annealing treatment of retaining the temperature at T1° C. for 100 to 1000 seconds following the second heat treatment, the first heat treatment, the second heat treatment, and the first annealing treatment are performed in an atmosphere of an oxygen partial pressure P1 satisfying the following expression (1), and an amount of C in the steel sheet after the first annealing treatment is 25 ppm or less, wherein the decarburization annealing process includes a second annealing treatment of retaining a temperature T2° C. satisfying the following expression (4) for 3 to 500 seconds in an atmosphere of an oxygen partial pressure P2 satisfying the following expression (3) after the first annealing treatment, wherein the decarburization annealing process includes a third heat treatment between the first annealing treatment and the second annealing treatment, and wherein the third heat treatment performs heating at an average heating rate HR3, which is 5 to 50° C./sec, in a temperature range from T1° C. to T2° C., $$0.0010 \leq P1 \leq 0.20 \tag{1},$$

$$770 \leq T1 \ (° \ C.) \leq 900 \tag{2},$$

$$P2 < P1 \tag{3},$$

$$960 \geq T2 \geq T1+10 \tag{4}.$$

2. The manufacturing method of a grain-oriented electrical steel sheet according to claim 1, wherein the steel piece contains one or more of 0.01 to 0.50% by mass of Cr, 0.01 to 0.50% by mass of Cu, and 0.01 to 0.02% by mass of Sn.

3. The manufacturing method of a grain-oriented electrical steel sheet according to claim 1, further comprising a nitriding treatment process of nitriding the steel sheet after the decarburization annealing process between the decarburization annealing process and the final annealing process, wherein the steel sheet after the nitriding treatment process is final-annealed in the final annealing process.

4. The manufacturing method of a grain-oriented electrical steel sheet according to claim 1, wherein the steel piece contains 0.017% by mass or more and 0.08% by mass or less of S.

5. The manufacturing method of a grain-oriented electrical steel sheet according to claim 1, wherein the cold-rolled steel sheet has a final sheet thickness of 0.23 mm or more.

6. The manufacturing method of a grain-oriented electrical steel sheet according to claim 1, wherein the cold-rolled steel sheet has a final sheet thickness of more than 0.23 mm.

* * * * *